United States Patent [19]

Bulpitt

[11] 4,279,507
[45] Jul. 21, 1981

[54] SPATIAL SCANNING MEANS FOR A PHOTOMETER

[75] Inventor: Thomas H. Bulpitt, Northridge, Calif.

[73] Assignee: Kollmorgen Corporation, Hartford, Conn.

[21] Appl. No.: 69,779

[22] Filed: Aug. 27, 1979

[51] Int. Cl.³ .................. G01J 1/04; G02B 27/17
[52] U.S. Cl. .................. 356/225; 350/6.4; 350/484
[58] Field of Search .......... 350/6.3, 6.4, 6.5, 52, 350/285, 301; 355/8; 358/205, 206; 356/218, 225, 226

[56] References Cited

U.S. PATENT DOCUMENTS

| | | | |
|---|---|---|---|
| 954,707 | 4/1910 | Spear | 350/52 |
| 1,250,393 | 12/1917 | Vanderlip | 350/52 |
| 2,792,448 | 5/1957 | Deuth et al. | 350/6.4 X |
| 3,383,151 | 5/1968 | Kohler et al. | 350/48 |
| 3,544,797 | 12/1970 | Früngel | 250/216 |
| 3,552,834 | 1/1971 | Vogl et al. | 350/285 |
| 3,642,343 | 2/1972 | Tchejeyan et al. | 350/6.5 |

FOREIGN PATENT DOCUMENTS 17355 of 1915 United Kingdom ............ 350/52

OTHER PUBLICATIONS

Walker, *Optical Engineering*, vol. 13, No. 6, Nov./Dec. 1974, pp. G233 and G234.

*Primary Examiner*—F. L. Evans
*Attorney, Agent, or Firm*—Poms, Smith, Lande & Rose

[57] ABSTRACT

A scanning device adapted to be associated with a radiant energy measuring meter such as a luminance photometer to provide precision linear or angular scanning across an area of an object or a subject being measured without relative movement of the meter or subject. A scanning device which includes an optical assembly having an objective lens and a prism movable as a unit along or about the optical axis portion of light beams reflected or folded by and between the prisms whereby light received by the photometer is on the optical axis of the photometer regardless of the position of the movable optical assembly on the folded optical axis portion. Means are provided for moving the movable optical assembly linearly with respect to the optical axis portion for linear transverse scanning of a subject area or rotatively about said optical axis portion for angular scanning of a subject area. A scanning device for a luminance photometer which provides scanning microphotometric capability as, for example, to determine luminous cross-section of a cathode ray tube display.

10 Claims, 6 Drawing Figures

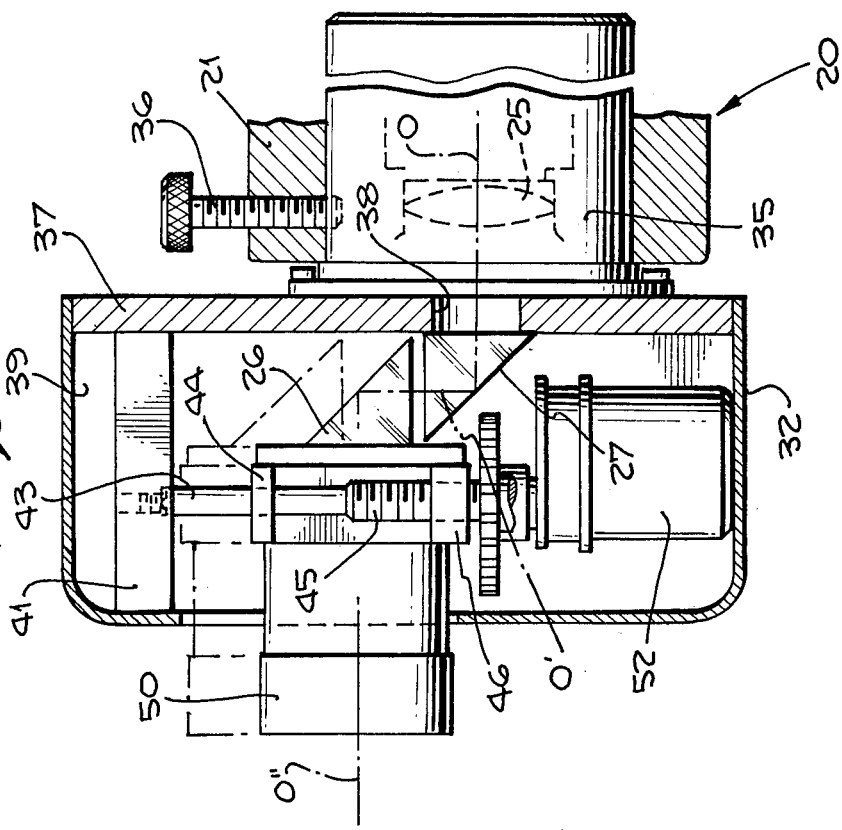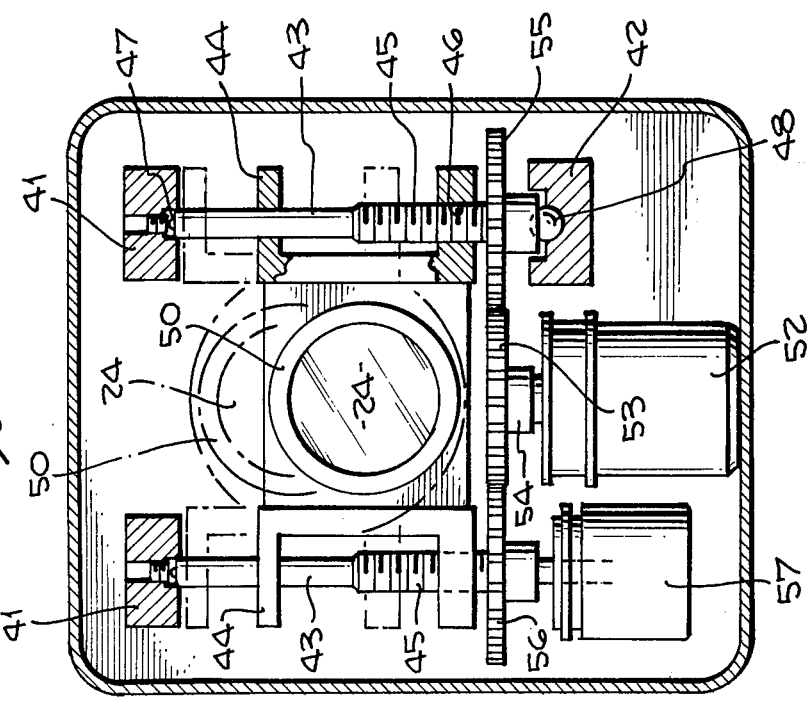

SPATIAL SCANNING MEANS FOR A PHOTOMETER

BACKGROUND OF THE INVENTION

The invention relates to luminance and/or radiance meters and to the measurement of certain characteristics of a selected area of a luminous light source. In particular the invention is directed toward a device for measuring size and brightness uniformity of the area being measured, contrast ratio of such area, modulation transfer functions, and for microdensitometry purposes.

Various optical systems for measuring fields in luminance and radiance meters have been utilized such as described in an article entitled "Optical Systems for Defining the Viewing and Measuring Fields in Luminance/Radiance Meters" by Richard A. Walker, published in Volume 11, No. 9 of the September 1972 issue of Applied Optics. While such optical systems defined the viewing and measuring fields of a subject, scanning of the subject generally required either moving the entire photometer relative to the subject, moving the imaging lens system, or moving a part of the lens system. In one prior proposed scanning system, a fiber optic probe with a measuring aperture attached thereto was laterally moved to scan the focal plane of a lens. Such scanning system moved off the optical axis of the lens and any such off-axis measurements were subject to reduction by the fourth power of the cosine of the off-axis angle.

In another prior proposed scanning system, the measuring aperture was stationary and the objective lens was laterally moved to scan the subject field. Such scanning system was also subject to the cosine fourth law disadvantage.

Further, prior proposed means for scanning and measuring light from a subject area included devices such as cross slides, rotary tables, and motorized drives for moving an entire instrument having an optical head in a linear or rotary motion. Such instrument moving means were capable of providing precise linear of angular scanning of the subject area but included disadvantages in that the means for moving the instrument usually had several times the mass of the instrument being moved. Thus movement of the instrument resulted in difficulty in rendering the system isolated from unwanted vibrations and in precisely controlling its movement.

Image scanners mentioned above included disadvantages in that when an aperture is moved off of the optical axis, the measurement of luminance or radiant power is subject to the cosine-4th Law of Image Illumination. Another disadvantage is that the dimensions measured in the subject area depend upon the objective lens magnification which changes with the distance from the object and the off-axis angle.

SUMMARY OF THE INVENTION

The present invention relates to an optical scanning means which avoids many of the disadvantages of prior art scanning devices and systems and provides a scanning means of relatively small size which may be readily adapted to and associated with standard luminance photometers, a preferred example being that of the Pritchard photometer as described and claimed in U.S. Pat. No. 3,813,172 issued May 28, 1974.

The present invention contemplates a small movable optical system or assembly attachable to a luminance photometer in such a manner that the subject area being viewed by the moving scanning optical system will always be on the optical axis of a photometer. The on-axis relationship of the scanning optical system to the photometric luminance measuring system avoids the cosine-4th characteristic of image illumination and also maintains subject dimension measurement accuracy related solely to the precision of its mechanical means. The present invention contemplates a scanning optical assembly which may be readily interchanged with a standard objective lens of a luminance photometer such as the Pritchard photometer to convert the luminance photometer into a high resolution scanning microphotometer. The invention specifically contemplates a scanning optical system or assembly which includes an objective callimating lens and a 90° reflecting prism which may be linearly movable as a unit along the optical axis portion reflected or folded by the prism or which may be rotated as a unit about such optical axis portion to provide angular scanning.

The primary object of the present invention therefore is to provide a novel scanning means readily associated with a luminance or radiance meter for measurement of radiant energy from a selected subject area and for scanning such area in an on-axis condition and without relative movement between the subject area and the meter.

An object of the present invention is to provide a movable scanning optical system readily associated with a luminance photometer.

A further object of the present invention is to provide a scanning optical system in which the distance scanned on the subject area is precisely the movement of moving means supporting a unitary movable objective lens and associated reflecting prism.

Other objects of the invention are to provide a novel scanning optical system of small size, readily adapted for assembly with a luminance or radiance meter, providing energy measurement free from cosine fourth limitations, providing precision measurement of subject size, contrast ratio, and modulation transfer functions, and to readily convert a photometer into a high-resolution scanning microphotometer.

A more specific object of the present invention is to provide a movable scanning optical system for association with a luminance photometer in which means are provided for moving the scanning optical system a selected distance at preselected speeds.

Various other objects and advantages of the present invention will be readily apparent from the following description of the drawings in which exemplary embodiments are shown.

In the drawings:

FIG. 3 is a fragmentary side sectional view of a scanning means embodying this invention associated with a photometer and illustrating drive means for moving a unitary movable optical assembly of the scanning means of this invention.

FIG. 4 is an front view of FIG. 3 with the front cover plate removed.

Figure 1:
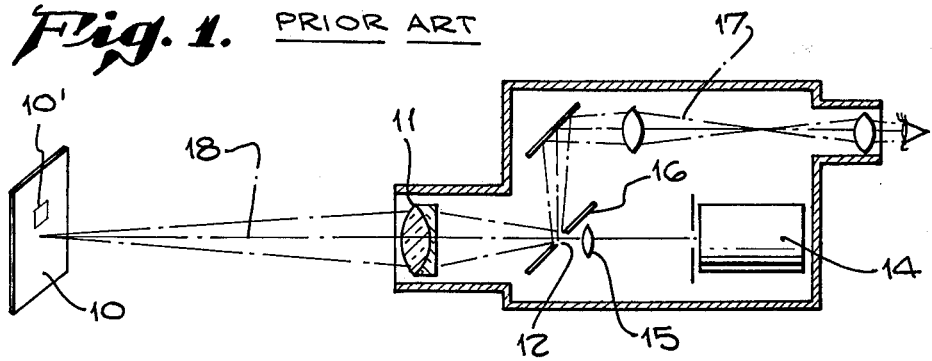
FIG. 1 is a schematic view of a prior art luminance photometer.

In FIG. 1 a luminance photometer known as a "Spectra" Pritchard photometer is schematically illustrated, a modification being shown in U.S. Pat. No. 3,813,172 issued May 28, 1974 to a common assignee. In such prior photometer a subject or object 10 is viewed by an objective lens 11 and an image of the subject 10 or area portion thereof is focused on a measuring aperture 12. The dimensions of the measuring aperture define the field or subject area being measured by a photosensor 14 after the light passes through a relay lens 15. Measuring aperture 12 is provided in a mirror surfaced member 16 arranged at an angle to reflect a portion of the light along a viewing light path 17. As seen through the viewfinder the measured field appears as a lesser angular field defined by a reticle or the aperture 12 itself within a larger field of view which surrounds the aperture. In order to measure selected subject areas such as 10' which are spaced from or off the optical axis 18 the entire instrument including the optical, viewing and measuring system must be moved to recenter the new area 10' on optical axis 18.

Figure 2:
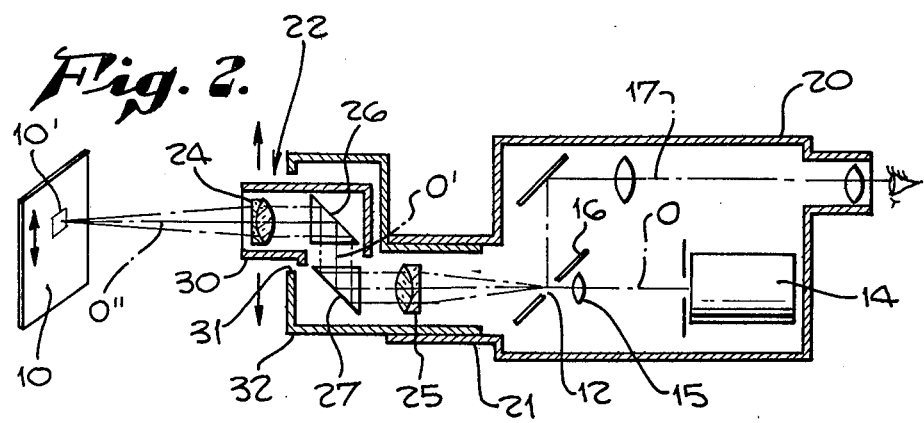
FIG. 2 is a schematic view of a scanning means of this invention associated with a luminance photometer such as that shown in FIG. 1.

The present invention is schematically illustrated in FIG. 2 is adapted to be associated with the photometer shown in FIG. 1 although it will be understood that it may be adapted to other types of photometers if desired. In FIG. 2 the luminance photometer 20 includes measuring aperture 12, photosensor 14, relay lens 15, mirror 16, and viewing light path indicated at 17. Objective lens 11 of FIG. 1 is removed from its position at the front tubular portion 21 of the Photometer 20 and an optical scanning means 22 of this invention is associated with the front tube portion 21.

Optical scanning means 22 comprises an objective light collimating lens 24 spaced forwardly and laterally of a telescopic lens 25 located on the optical axis O of the photosensor 14, imaging lens 15, and aperture 12. Telescopic lens 25 is fixed in relation to optical axis O by suitable means not shown in schematic FIG. 2.

Between lens 24 and lens 25 is provided a pair of light beam folding or reflecting members such as prisms 26 and 27. Prisms 26 and 27 may be of total internal reflection type and provide lateral displacement of the optical axis O as indicated by the lateral optical axis portion O'. The optical axis O" of collimating lens 24 is reflected or folded by prism 26 to be coincident with lateral optical axis portion O' which is also coincident with optical axis O. Prism 27 is fixed in relation to telescopic lens 25 on optical axis O.

Collimating lens 24 and prism 26 are mounted as a unit in a suitable frame or housing 30 for movement together on and along optical axis portion O'. Collimating lens 24 is focused on subject 10, collimates all light received therefrom in the space between lens 24 and 25, the telescopic lens 25 serving to focus the image of subject 10 at the measuring aperture 12. Movement of the scanning unit namely collimating lens 24 and prism 26 in the direction of the optical axis portion O' or vertically as shown in FIG. 2 will cause the objective lens 24 to scan a subject area 10' in a vertical direction to the extent permitted by the opening 31 in housing 32 or to the extent permitted by a slide and feed screw mechanism as shown in FIGS. 3 and 4.

Thus subject area 10' may be linearly scanned without movement of photometer 20 and in each position or incremental step position of the movable scanning unit comprising lens 24 and prism 26, the subject area scanned will always be on the optical axis O", O', O. Off axis readings are avoided as the image of subject area 10 at the fixed aperture 12 is scanned and measured by photosensor 14.

In the event radial scanning of subject area 10' is desired the photometer may be rotated about optical axis O so that the direction, that is the lateral and linear movement of movable unit, lens 24 and prism 26, will be along selected radial lines.

An exemplary means for moving the movable unitary objective collimating lens and associated prism 26 is shown in FIGS. 3 and 4. In FIG. 3 the forward end tube 21 of the photometer 20 is partially shown and receives a tubular rearwardly extending portion 35 of scanning housing 32. Tube portion 35 may be suitably secured by a thumbscrew 36 on tube portion 21 which engages the outer cylindrical surface of tube portion 35. Within tube portion 35 is fixedly positioned telescopic lens 25 on optical axis O of photometer 20. The housing 32 includes a wall 37 having a port 38 aligned with optical axis O for transmitting collimated light reflected from fixed prism 27 which may be secured to wall 37 in any suitable manner. Within chamber 39 provided by housing 32 which may be of generally cup-shape are spaced fixed frame bars 41 and oppositely disposed bars 42 (only one being shown). Between each set of bars 41 and 42 may be mounted a lead or feed screw 43 upon which a movable U-shaped nut means 44 may be mounted for advancement and retraction along feedscrew 43. Screw 43 has a threaded portion 45 in threaded engagement at 46 with nut means 44. Feedscrew 43 may be suitably anti-frictionally supported for rotation by ball means 47 and 48. Between the spaced nut means 44 and fixed thereto may be movable scanning tube 50 in which is suitably mounted objective lens 24 and its associated prism 26.

Means for moving tube 50 with its associated objective collimating lens 24 and prism 26 linearly along feedscrew 43 may comprise a suitable motor means 52 having a drive gear 53 connected to its motor shaft 54, drive gear 53 having meshed engagement with gears 55 and 56 for synchronously rotating feedscrews 43 on opposite sides of the tube 50. Motor means 52 may be a suitable step motor for incrementally advancing and retracting objective lens 24 and prism 26 along the feedscrews.

Attached to one of the feedscrews 43 may be a multiturn potentiometer 57 which may provide an analog output voltage which will be proportional to the distance scanned by movement of the objective lens 24 along the feedscrew path. A precise measurement of the displacement of the scanning lens 24 is readily obtained. It will be understood that the exemplary potentiometer 57 may be replaced by other suitable digital resolvers or other devices for digital analog measurement.

It will be understood that when the scanning means of this invention is associated with a luminance or radiance meter, the objective lens 11 is replaced by optical scanning means 22 of this invention. As illustrated in FIGS. 3 and 4 scanning means 22 serves as an accessory which may be readily mounted on the meter.

Figure 6:
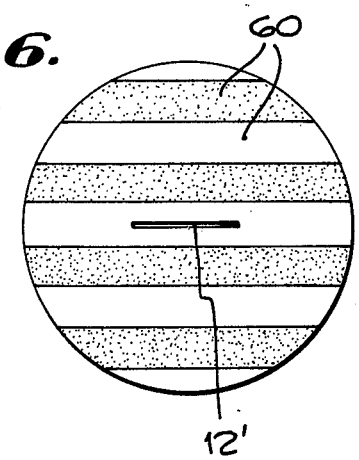
FIG. 6 is an operator's view through the eyepiece of a Pritchard Photometer and scanning means of this invention during a typical high resolution scan.

FIG. 6 is illustrative of one of the uses of the scanning means of this invention and shows subject area being scanned as viewed through the viewfinder with a slit-type measuring aperture indicated at 12'. The subject area viewed in FIG. 6 shows a typical high resolution scan as seen on the face of a cathode ray tube. The width of lines 60 may be nominally one mil (0.001 inches, 0.025 millimeters) and the smaller slit aperture 12' may be a 0.4×10 minute aperture of a Pritchard photometer.

It will be understood that circular apertures may be used in place of the slit aperture 12' shown.

The scanning optical system of this invention provides that the movable unit containing the objective collimating lens and associated prism may be driven by motor 52 so that the scanning means traverses approximately 0.5 inches (12 millimeters 12 mm) of the subject area regardless of lens magnification. Scanning speed may be continuously variable and selectable by the operator. It will be apparent that the scanning means of this invention provides measurements on cathode ray tubes and other displays of lined width, contrast ratio, brightness uniformity, and modulation transfer functions. A specific application of the scanning means of this invention when used with a luminance photometer is to determine the luminous cross-section of the cathode ray tube ray tube raster or stroke display.

Figure 5:
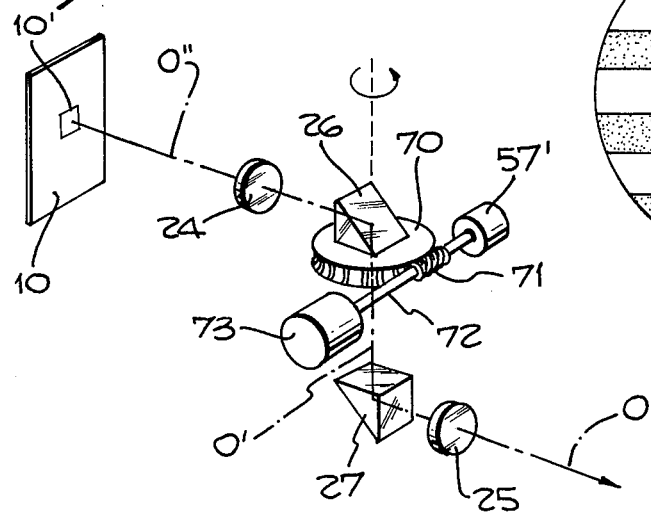
FIG. 5 is a schematic view of the scanning means of this invention arranged to provide angular scanning.

In the modification of this invention schematically illustrated in FIG. 5. The movable unitary objective collimating lens 24 and associated prism 26 may be mounted on a suitable gear means 70 having an axis of rotation coincident with the lateral optical axis portion O'. Telescopic lens 25 and its associated fixed prism 27 are optically related to the movable lens 24 and prism 26 in the same manner as described above. The gear means 70 may be rotated by a suitable worm gear 71 attached to a shaft 72 of a driving motor means 73. Motor means 73 may be similar to motor 52 and suitable gearing provided to drive worm gear 71. The opposite end of shaft 72 may include a multi-turn potentiometer 57' as mentioned above for determining the angle of rotation.

Rotation of the gear means 70 about axis portion O' of the associated prisms 26, 27 provides for on-axis transmission of the subject area 10' being scanned on axis O" to the optical axis O, the image being formed in the measuring aperture 12. It is thus apparent that the angular scanning system shown in FIG. 5 includes all of the advantages of the linear scanning described in the prior embodiment of the invention.

Those skilled in the art will recognize that the relatively small size and mass of the movable objective lens 24 and prism 26 permits the use of a much smaller mechanical translator or mover than would be required to move the entire photometer 20. Since the measured area of the subject is always on axis in the optical system of this invention, the optical system is not subject to the cosine fourth law. Further, regardless of image magnification produced by selection of lenses 24 and 25, the distance scanned on subject 10 is always precisely the distance travelled by the slide or gear means carrying the lens 24 and prism 26 and is precisely measurable.

In the described embodiment of the invention, the preferred type of prism has been indicated as a total internal reflection prism which avoids polarization of light normally inherent to reflecting surfaces. Where polarization sensitivity is not important, as for example, in some radiance meters, these prisms may be replaced with mirrors.

It will be understood that modifications and changes may be made in the scanning means described above and all such changes and modifications coming within the scope of the appended claims are embraced thereby.

I claim:

1. An optical scanning means adapted to be associated with an optical system of a photometer to enable the photometer to measure a selected area portion of a luminance display comprising:
   a telescopic lens and a first prism arranged in fixed relation with respect to said photometer optical system;
   a collimating lens and a second prism arranged for movement relative to the first mentioned prism,
   said prisms being arranged to fold the optical axis of said collimating lens and second prism laterally along an optical axis portion and to transmit collimated light to the optical axis of said telescopic lens and first prism and in coaxial relation therewith;
   and means for moving the collimating lens and second prism relatively with respect to the optical axis portion extending between said prisms to scan at least a selected area portion of the display without movement of the photometer.

2. A scanning means as stated in claim 1 wherein said moving means provides linear transverse movement of said collimating lens and said second prism along said optical axis portion.

3. A scanning means as stated in claim 1 wherein said moving means provides rotation of said collimating lens and second prism about said optical axis portion for angularly scanning a selected area portion.

4. An optical scanning means as stated in claim 1 wherein said moving means includes
   a slide means carrying said collimating lens and second prism;
   and feed screw means in cooperable engagement with said slide means for linear movement thereof for linear scanning.

5. A scanning means as stated in claim 4 including means for measuring the distance scanned.

6. A scanning means as stated in claim 1 wherein said moving means includes
   means including gear means for mounting said collimating lens and second prism for rotation about said optical axis portion;
   and a worm shaft for driving said gear means.

7. In combination with a radiant energy measuring meter having a measuring aperture, the provision of:
   an optical scanning system comprising
   laterally and longitudinally spaced first and second lens means;
   a pair of prisms between said first and second lens means for folding the optical axes of both lens means along a coincident laterally extending optical axis portion between said prisms;
   one of said lens means being a collimating lens whereby collimated light is transmitted along said optical axis portion between said prisms,
   and means for mounting said one of said lens means and its associated prism for movement relative to the lateral optical axis portion.

8. The combination as stated in claim 7 wherein: the other of said lens means being a telescopic lens for focusing the received collimated light on and at a measuring aperture.

9. An optical scanning means for enabling the measurement of selected area portions of luminance displays by a radiant energy measuring meter, comprising
   a collimating lens adapted to be focused on a radiant energy display and to collimate radiant energy beams received therefrom;

an energy reflecting member associated with said collimating lens;

said energy reflecting member transmitting the received collimated radiant energy beams along a folded path;

a second energy reflecting member receiving and reflecting said collimated radiant energy beams;

a telescopic lens for receiving the collimated radiant energy beams from said second reflecting member and for focusing and imaging said beams at a measuring aperture;

and means for moving said collimating lens and said first mentioned reflecting member along an optical axis portion between said energy reflecting members for scanning the luminance display.

10. A scanning means as stated in claim 9 wherein said energy reflecting members are total internal reflective prisms.

* * * * *